(12) United States Patent
Hultell et al.

(10) Patent No.: US 9,198,050 B2
(45) Date of Patent: Nov. 24, 2015

(54) DEVICE AND METHOD FOR IMPROVED CLOSED LOOP DIVERSITY

(75) Inventors: Johan Hultell, Solna (SE); Johan Bergman, Stockholm (SE); Bo Göransson, Sollentuna (SE); Niklas Johansson, Uppsala (SE); Erik Larsson, Uppsala (SE); Fredrik Ovesjö, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 348 days.

(21) Appl. No.: 13/202,677

(22) PCT Filed: Aug. 19, 2011

(86) PCT No.: PCT/SE2011/050999

§ 371 (c)(1),
(2), (4) Date: Apr. 26, 2013

(87) PCT Pub. No.: WO2012/026868

PCT Pub. Date: Mar. 1, 2012

(65) Prior Publication Data

US 2013/0208704 A1      Aug. 15, 2013

Related U.S. Application Data

(60) Provisional application No. 61/375,931, filed on Aug. 23, 2010.

(51) Int. Cl.
*H04W 16/28*    (2009.01)
*H04B 7/04*    (2006.01)
*H04B 7/06*    (2006.01)

(52) U.S. Cl.
CPC ............. *H04W 16/28* (2013.01); *H04B 7/0404* (2013.01); *H04B 7/0417* (2013.01);

(Continued)

(58) Field of Classification Search
CPC ..... H04W 40/00; H04W 52/04; H04W 16/28; H04B 7/02; H04L 1/02
See application file for complete search history.

(56) References Cited

U.S. PATENT DOCUMENTS 7,593,729 B2 *   9/2009   Barak et al. ................ 455/435.1
7,620,370 B2 *   11/2009   Barak et al. ................ 455/67.13

(Continued)

OTHER PUBLICATIONS

3GPP TSG RAN WG1 61bis R1-103708, titled Specifying Basic Building Blocks of UL Multi-Antenna Transmission (R1-103708 hereinafter) was published as Agenda Item 6.4.5, 3GPP TSG RAN WG1 61bis, pp. 01-08.*

(Continued)

*Primary Examiner* — Andrew Lai
*Assistant Examiner* — Hoyet H Andrews
(74) *Attorney, Agent, or Firm* — Baker Botts, LLP

(57) ABSTRACT

A NodeB for an HSPA enabled WCDMA network, arranged to transmit beam forming instructions to a User Equipment, a UE, which is arranged for beam forming. The beam forming instructions comprise information identifying a code book with one or more code words, and the NodeB is also arranged to transmit code words from said code book to the UE at a certain rate. The NodeB is further arranged to determine said rate based on dynamically varying information available in the WCDMA network, and to receive said information on the code book from an RNC upon configuration of the UE or to choose code book based on said dynamically varying information available in the WCDMA network.

18 Claims, 8 Drawing Sheets

(52) U.S. Cl.
CPC ........... *H04B 7/0617* (2013.01); *H04B 7/0634*
(2013.01); *H04B 7/0639* (2013.01); *H04B*
*7/0665* (2013.01); *H04B 7/0647* (2013.01)

(56) References Cited

U.S. PATENT DOCUMENTS

| | | | | |
|---|---|---|---|---|
| 7,630,732 | B2* | 12/2009 | Pan et al. | 455/522 |
| 7,916,745 | B2* | 3/2011 | De Carvalho et al. | 370/437 |
| 7,933,560 | B2* | 4/2011 | Han et al. | 455/69 |
| 8,355,351 | B2* | 1/2013 | Yang et al. | 370/280 |
| 8,625,693 | B2* | 1/2014 | Tsai et al. | 375/267 |
| 8,649,455 | B2* | 2/2014 | Clerckx et al. | 375/267 |
| 8,654,820 | B2* | 2/2014 | Hoshino et al. | 375/219 |
| 2003/0103877 | A1* | 6/2003 | Long | 422/186.04 |
| 2006/0094373 | A1* | 5/2006 | Hottinen | 455/73 |
| 2007/0002963 | A1* | 1/2007 | Pedersen et al. | 375/267 |
| 2009/0080546 | A1* | 3/2009 | Zhao et al. | 375/260 |
| 2010/0103877 | A1* | 4/2010 | Wang et al. | 370/328 |

OTHER PUBLICATIONS

3GPP TS 36.212 V9.4.0 (Sep. 2011), titled 3rd Generation Partnership Project; Technical Specification Group Radio Access Network; Evolved Universal Terrestrial Radio Access (E-UTRA); Multiplexing and channel coding (Release 9) was published Sep. 2011.*

International Search Report and Written Opinion mailed Nov. 2, 2011 in corresponding Application No. PCT/SE2011/050999.

Texas Instruments: "Specifying Basic Building Blocks of UL Multi-Antenna", 3GPP Draft; R1-103708 TI UL MIMO Spec, vol. RAN WG1, Jun. 22, 2010, XP050449141, pp. 3-7.

QUALCOMM: "On the Benefits of Uplink Closed Loop Transmit Diversity", 3GPP Draft; R1-104737_On the Benefits of UL CLTD, vol. RAN WG1, Aug. 17, 2010, XP050449978.

Motorola: "Uplink SU-MIMO Design Options for LTE Advanced", 3GPP Draft; R1-090805, Feb. 3, 2009, XP050318661.

Huawei: "Uplink Close Loop Transmit Diversity for HSPA", 3GPP Draft; R1-104750 Uplink CLTD for HSPA, vol. RAN WG1, Aug. 19, 2010, XP050450199.

$3^{rd}$ Generation Partnership Project; Technical Specification Group Radio Access Network, Uplink Transmit Diversity for High Speed Packet Access (Release 10); No. V10.0.0, Jul. 5, 2010, pp. 1-212, XP050442001, pp. 16-19, 177-178.

3rd Generation Partnership Project; Technical Specification Group Radio Access Network; Medium Access Control (MAC) protocol specification (Release 9) 2010.

English summary of Vietnamese office action issued in a corresponding Vietnamese application on May 3, 2013 (One page).

* cited by examiner

| Code Book XX | | | |
|---|---|---|---|
| Set/vector | Pre-coding weights | | Code word |
| 0 | $W_{11}$ | $W_{21}$ | 00 |
| 1 | $W_{12}$ | $W_{22}$ | 01 |
| 2 | $W_{13}$ | $W_{23}$ | 10 |
| 3 | $W_{14}$ | $W_{24}$ | 11 |

Fig. 2

DEVICE AND METHOD FOR IMPROVED CLOSED LOOP DIVERSITY

This application is the U.S. national phase of International Application No. PCT/SE2011/050999 filed 19 Aug. 2011 which designated the U.S. and claims priority to U.S. Provisional Application No. 61/375,931 filed 23 Aug. 2010, the entire contents of each of which are hereby incorporated by reference.

TECHNICAL FIELD

The present invention discloses a WCDMA NodeB and a method for operating a WCDMA NodeB which gives improved closed loop diversity.

BACKGROUND

In the third generation partnership project, 3GPP, there have been evaluations of both open loop beam forming and open loop antenna switching for uplink transmissions in WCDMA/HSPA. Both of these techniques are based on a User Equipment, a UE, with multiple transmit antennas which exploits the existing downlink feedback channels, e.g. F-DPCH, Fractional DPCH, or E-HICH, E-DCH HARQ Acknowledgement Indicator Channel, to determine a suitable pre-coding vector with which the transmitted signal is multiplied in an autonomous fashion in order to maximize the signal to noise plus interference ratio, SIR, at the receiving NodeB. A pre-coding vector comprises a set of pre-coding weights, i.e. a set of weight factors with which the signal from each of the antennas of the UE is multiplied with before transmission, in order to achieve a desired beam forming. The traffic from each antenna of the UE will be multiplied with one of the weight factors in a pre-coding vector prior to transmission, so that for a UE with N antennas we should have a pre coding vector $[w_1 \ldots w_N]$, where the signal from antenna 1 is multiplied by $w_1$, the signal from antenna 2 is multiplied by $w_2$, and where the signal from antenna N is multiplied by $W_N$.

However, in such solutions, since the network is unaware of the pre-coding weights that the UE selects and applies, a receiving Node-B will experience a discontinuity in the measured power when a change in pre-coding weights occurs.

There have also been proposals in 3GPPP for introducing so called closed loop transmit diversity, by which we refer to both so called closed loop beam forming and closed loop antenna switching for WCDMA/HSPA. Contrary to the open loop techniques, where the UE decides the pre-coding weights in an autonomous way, in the closed loop techniques, the network, e.g., the serving Node-B determines the preferred pre-coding vector with which the signals from the antennas of the UE are to be multiplied. In order to signal the necessary downlink feedback information to the UE, the Node-B can either rely on one of the existing physical channels, e.g., F-DPCH, or a new downlink feedback channel could be introduced for this purpose.

Regardless of the physical channel that is used to signal the downlink feedback information, a key aspect of closed loop transmit diversity schemes is that the downlink feedback scheme should allow the downlink overhead to be minimized while, at the same time, ensuring that the UE receives downlink feedback with sufficient frequency and granularity in order for the multi-antenna transmissions to be beneficial.

The frequency and granularity of the downlink feedback that is required will vary with the following:
UE equipment (e.g., if the UE has antennas with different efficiency due to form factor considerations, or if there are significant performance differences between the antennas due to imperfections)
Small-scale shadowing (e.g., body effects), and
The coherence time of the wireless channel.

The first two of the listed causes above will create variations that occur on a rather slow time scale and they can often be viewed as stationary for several seconds. The third cause, i.e. the wireless channel, may on the other hand vary on a much faster time scale. In fact, the speed with which the wireless channel varies will depend on environment, e.g. if the UE is stationary or mobile, if the UE is located indoors or outdoors, etc.

The term "effective channel" will be used here, sometimes also referred to as the "composite channel", when referring to the radio channel that incorporates the effect of the transmit antenna(s), pre-coding weights (with which the transmitted signal is multiplied) as well as the wireless channel between the transmitting and receiving antenna(s).

Another term which will also be used in the following is the term "code book", which will be used to refer to a pre-defined mapping by means of which the network, e.g. the NodeB and/or the RNC, can signal/convey information to the UE about the pre-coding vectors that the UE should apply. The codebook is composed of one or multiple code words, and each code word is used to inform the UE about a desired modification of the currently used pre-coded weight. This can also be expressed by saying that each code word in a code book identifies a pre-coding vector. It should be pointed out that the term "a desired modification" also refers to the case where it is desired to maintain the present pre-coding vector, i.e. a "zero change".

In closed loop transmit diversity mode/beam forming described above, although the serving Node-B controls the pre-coding weight selection in the UE, in principle, it is also possible to let a non-serving Node-B be able to control the pre-coding weights used by the UE. One key issue in scenarios with multiple NodeBs, (for example, so called soft handover) is that even though the Node-B that controls the selection of pre-coding weights will know if and when a UE changes its pre-coding vector, the other Node-Bs in the so called active set will not be aware of this. From the perspective of these Node Bs, a change in pre-coding weights will result in a discontinuity in measured power, which is detrimental from a system performance point of view, since it will, for example, adversely affect load estimation.

In summary, closed loop transmit diversity/bean forming techniques will increase the coverage and capacity of the system, but will however be associated with additional traffic overhead, which stems from:
Additional uplink overhead since transmissions of multiple DPCCHs are needed in order to allow the Node-B to estimate the full effective channel. This is needed to determine suitable pre-coding weights.
Additional downlink overhead since the new feedback information carrying the pre-coding weight information needs to be signaled from the Node-B to the UE. As noted above, the intensity and granularity of this feedback information will, e.g., depend on how rapidly the wireless channel (and/or the effective channel) changes and the type of pre-coding weight selection algorithm implemented in the Node-B.
Another drawback associated with closed loop transmit diversity is that too frequent and too large changes in precoding weights will cause abrupt changes in the power measured by neighbouring Node Bs which do not control precoding weight generation of the UE and which are therefore unaware of the change pre-coding weight. This will result in more varying interference levels, as well as inferior channel estimates. Clearly, this could be aided by limiting the rate and size with which the pre-coding weights are changed in these scenarios.

SUMMARY

It is an object of the invention to obviate at least some of the drawbacks mentioned above in WCDMA/HSPA which use closed loop transmit diversity or beam forming.

This object is achieved by means of a NodeB for an HSPA enabled WCDMA network. The NodeB is being arranged to transmit beam forming instructions to a User Equipment, a UE, which is arranged for beam forming. The beam forming instructions comprise information identifying a code book with one or more code words, and the NodeB is also arranged to transmit code words from said code book to the UE at a certain rate.

The NodeB is further arranged to determine said rate based on dynamically varying information available in the WCDMA network, and to receive the information on the code book from an RNC upon configuration of the UE or to choose code book based on the dynamically varying information available in the WCDMA network.

In embodiments, the NodeB is arranged to transmit said information on a code book on the HS-SCCH channel, and to then transmit code words from the code book on a per slot or per sub-frame basis.

In embodiments, the NodeB is arranged to choose the size of the code book based on the speed with which the effective radio channel between the UE and the NodeB varies, so that for a slowly varying effective radio channel, a larger code book is chosen, and for a rapidly varying effective radio channel, a smaller code book is chosen.

In embodiments, the NodeB is arranged to choose the rate with which it transmits the code words to the UE based on the speed with which the effective radio channel between the UE and the NodeB varies, so that for a slowly varying effective radio channel, code words are transmitted less frequently than for a rapidly varying effective radio channel.

In embodiments, the NodeB is arranged to choose code books with code words which will cause amplitude differences between the signals which are transmitted from the UE's antennas.

In embodiments, the NodeB is arranged to transmit code words to the UE from a code book which has previously been identified to the UE by the NodeB as an order on the HS-SCCH channel or by the UE's Serving RNC via RRC signaling.

In embodiments, the NodeB is arranged to transmit a reference code word to the UE as an HS-SCCH order or from the UE's Serving RNC via RRC signaling, and to then, on another channel, transmit code words which indicate incremental changes from the beam forming identified by the reference code word.

In embodiments, the code words in the code books in the NodeB are comprised of binary digits, with at least one code word being comprised of fewer binary digits than another code word, and with code words that are more likely to be transmitted being those which comprise fewer binary digits than code words that are less likely to be transmitted.

In embodiments, the NodeB is arranged to use a first codebook in which the code words identify absolute values for the UE's beam forming, and a second codebook in which the code words are relative, i.e. identify changes in current beam forming.

In embodiments of the NodeB, the dynamically varying information available in the WCDMA network is information available to one or more of the NodeB, neighbouring NodeBs and the serving RNC and comprises one or more of the following:

The channel coherence time for the radio channel between the UE and the NodeB,
The delay spread in the uplink transmissions from the UE to the NodeB,
The available hardware resources,
The Doppler spread in the uplink transmissions from the UE to the NodeB,
The DPCCH SIR variations in the uplink transmissions from the UE to the NodeB,
The average DPCCH power levels or the uplink power headroom information.
The active set size,
The buffer status in the UE,
The happy bit information
UE antenna imbalance information.

The invention also discloses a method for operating a NodeB in an HSPA enabled WCDMA network. The method comprises transmitting beam forming instructions to a UE arranged for beam forming. The beam forming instructions comprise information identifying a codebook with one or more code words, and the method also comprises transmitting code words from the code book at a certain rate. The method comprises basing this rate on dynamically varying information available in the WCDMA network, and receiving the information on the code book from an RNC or choosing code book based on the dynamically varying information available in the WCDMA network.

In embodiments, the method comprises transmitting the information on a code book on the HS-SCCH channel, and subsequently transmitting code words in said code book on a per slot or per sub-frame basis, In embodiments, the method comprises choosing the size of the code book based on the speed with which the effective radio channel between the UE and the NodeB varies, so that for a slowly varying effective radio channel, a larger code book is chosen, and for a rapidly varying effective radio channel, a smaller code book is chosen.

In embodiments, the method comprises choosing the rate with which code words are transmitted based on the speed with which the effective radio channel between the UE and the NodeB varies, so that for a slowly varying effective radio channel, code words are transmitted less frequently than for a rapidly varying effective radio channel, code words a smaller code book is chosen.

In embodiments, the method comprises choosing code books with code words which will cause amplitude differences between the signals which are transmitted from the UE's antennas.

In embodiments, the method comprises transmitting the beam forming information to the UE as code words within a code book which has previously been identified to the UE by the NodeB as an order on the HS-SCCH channel or by the UE's Serving RNC via RRC signaling.

In embodiments, the method comprises transmitting a reference code word to the UE as an HS-SCCH order or from the UE's Serving RNC via RRC signaling, and to subsequently transmit, on another channel, code words which indicate incremental changes from the reference code word.

In embodiments of the method, the code words in the code books in the NodeB are comprised of binary digits, and at least one code word is comprised of fewer binary digits than another code word, and with code words that are more likely to be transmitted being those which comprise fewer binary digits than code words that are less likely to be transmitted.

In embodiments, the method comprises using a first codebook in which the code words identify absolute values for the UE's beam forming, and a second codebook in which the code words are relative, i.e, identify changes in a previously used code word.

In embodiments of the method, the dynamically varying information available in the WCDMA system is information available to one or more of the NodeB, neighbouring NodeBs and the serving RNC and comprises one or more of the following:

The channel coherence time for the radio channel between the UE and the NodeB,
The delay spread in the uplink transmissions from the UE to the NodeB,
The available hardware resources,
The Doppler spread in the uplink transmissions from the UE to the NodeB,
The DPCCH SIR variations in the uplink transmissions from the UE to the NodeB,
The average DPCCH power levels or the uplink power headroom information.
The active set size,
The buffer status in the UE,
The happy bit information
UE antenna imbalance information.

BRIEF DESCRIPTION OF THE DRAWINGS

The invention will be described in more detail in the following, with reference to the appended drawings, in which
FIG. 2 shows an example of a code book.

DETAILED DESCRIPTION

Figure 1:
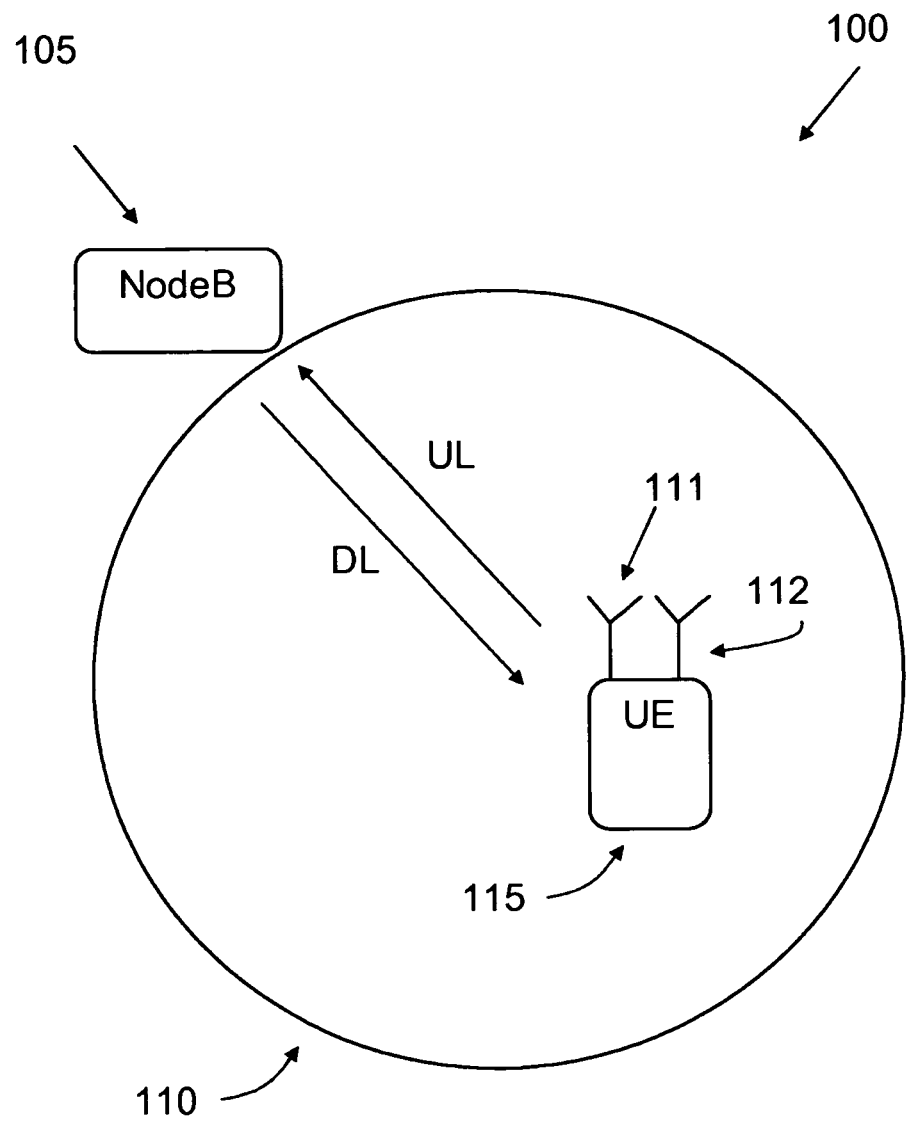
FIG. 1 shows a schematic view of a WCDMA system.

Embodiments of the present invention will be described more fully hereinafter with reference to the accompanying drawings, in which embodiments of the invention are shown. The invention may, however, be embodied in many different forms and should not be construed as being limited to the embodiments set forth herein. Like numbers in the drawings refer to like elements throughout.

The terminology used herein is for the purpose of describing particular embodiments only, and is not intended to limit the invention.

FIG. 1 shows a schematic view of a part of a WCDMA system 100 which is enabled for HSPA. The system comprises one or more cells 110, each of which can accommodate one or more User Equipments, UEs 115. One or more of the UEs 115 in a cell such as the one 110 can be equipped with more than one transmit antenna. As an example, the UE 115 is shown with two antennas 111, 112. Naturally, in most embodiments, a UE such as the one 115 which is equipped with multiple antennas will be arranged to use all of its antennas both for transmission and reception.

For each cell such as the one 110, there will be a controlling node, in WCDMA known as a NodeB. The NodeB of the cell 110 is shown as 105 in FIG. 1. A WCDMA system also comprises other, "higher level" nodes than those shown in FIG. 1, for example the node known as RNC, Radio Network Controller, which is a node that, inter alfa, controls one or more NodeBs, and which may also, if it is a so called Serving RNC, S-RNC, transmit control signals directly to a specific UE through the NodeB of the cell of the UE in question.

The WCDMA system 100 depicted in FIG. 1 utilizes so called closed loop transmit diversity, which is sometimes also referred to as closed loop beam forming. In such a system, a UE 115 with more than one transmit antenna is arranged to use its antennas for beam forming at least in the uplink, UL, direction, where the beam forming is controlled by the NodeB 105 although it is performed by the UE.

The NodeB 105 controls the beam forming of the UE 115 by means of transmitting information to the UE on a set of so called pre-coding weights. Each pre-coding weight in such a set is intended to be multiplied with the signals from one of the antennas 111, 112, of the UE prior to transmission, which will give rise to a "shaped beam" in the transmissions from the UE 115. By choosing the proper set of pre-coding weights, the NodeB 105 can cause the transmit beam from the UE 115 to have a shape which is optimal for the situation, and the NodeB can also, by adaptively changing the set of pre-coding weights, cause the transmit beam from the UE to adapt to the circumstances in an optimal manner. Such beam shaping is also referred to as beam forming.

Suitably, the sets of pre-coding weights are known in advance to both the UE and the NodeB, i.e. the pre-coding weights are stored in both the UE and the NodeB. Since this is the case, the NodeB only needs to identify the set of pre-coding weights which should be used by the UE, as opposed to explicitly informing the UE of the pre-coding weights as such.

The sets of pre-coding weights are thus known both to the UE and to the NodeB, so that the sets of pre-coding weights which should be used by the UE are identified to the UE by the NodeB by means of so called code words. The code words, in turn, are organized in code books, so that a NodeB can either identify a code book to a UE (as, for example, in the case of a code book with only one vector), or both a code book and the code word within the code book in question.

The concept of code words organized in code books is illustrated in FIG. 2, which shows a code book, numbered XX, which comprises four sets of pre-coding weights, the sets also sometimes being referred to as "pre-coding vectors". The pre-coding vectors are, as an example, numbered as 0-3, and have been assigned binary code words which correspond to their numbers, e.g. pre-coding vector 0 is identified by code word 00, and code word 3 is identified by code word 11. Each pre-coding vector in the code book comprises two pre-coding weights, which means that the code book is intended for a UE with two transmit antennas. Naturally, for a UE with N transmit antennas, code books can be used with vectors with N pre-coding weights, one for each antenna. As mentioned before, each pre-coding weight in a pre-coding vector is intended for multiplication with the signal which is to be transmitted from one of the antennas of the UE. For example, in the case of the code book in FIG. 2, if code word 00 is transmitted to the UE, pre-coding weight $W_{11}$ will be applied to the signals transmitted from one of the antennas of the UE and pre-coding weight $W_{21}$ will be applied to signals from the other antenna. In brief, $W_{mn}$ denotes the pre-coding weight applied to antenna m for stream n.

In order to further clarify the notion of pre-coding weights, reference will now be made to FIGS. 3 and 4, which illustrate two different principles which may be used with closed loop transmit diversity, i.e. closed loop transmit beam forming: in the example shown in FIG. 3, one of the DPCCHs (Dedicated Physical Control Channel), $DPCCH_1$ together with all other physical channels are transmitted using a primary beam, and a second DPCCH, $DPCCH_2$ is transmitted using a secondary beam. Note that two DPCCHs can be distinguished by the Node-B, e.g. by using different channelization codes. Two beams, referred to as the primary and the secondary beam are formed by the signals transmitted from both of the antennas indicated as 111 and 112, i.e. as the antennas of the UE 115 in FIG. 1, by means of different pre-coding vectors w1, w2. Here w1 denotes the pre-coding vector applied to the primary beam and it is composed of elements $W_{11}$ and $W_{21}$, while w2 denotes the pre-coding vector associated with the second stream and it is composed of $W_{12}$ and $W_{22}$.

Figure 3:
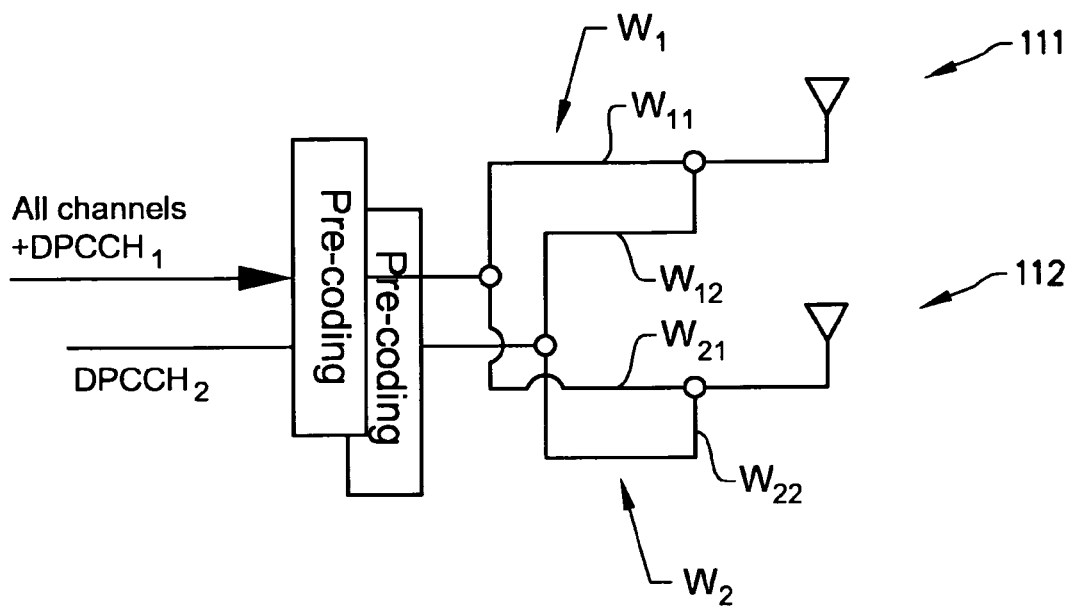
FIGS. 3 and 4 show examples of techniques for beam forming or transmit diversity.
Figure 4:
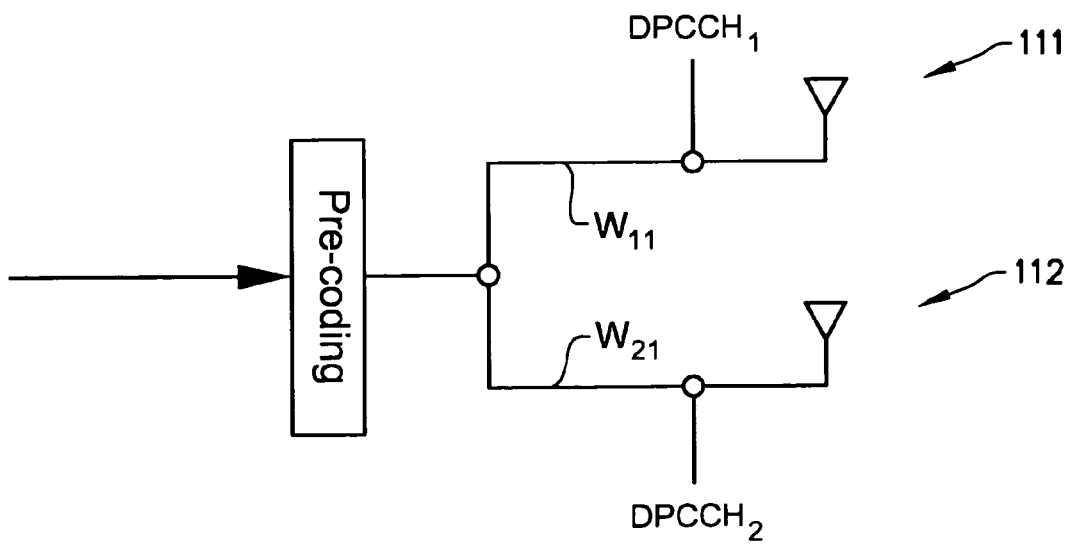

As opposed to the example shown in FIG. 3, in the example in FIG. 4 pre-coding weights are only applied to the "non-control channels", i.e. the data related channels, and the controls channels DPCCH1 and DPCCH2 are then added to the respective signal after the pre-coding weights have been applied. Both of the principles shown in FIGS. 3 and 4 are possible to apply to this invention.

Due to the use of the closed loop principle for beam forming, information has to be transmitted from the NodeB to the UE identifying code books and/or code words. Naturally, it is a desire to keep such information ("overhead") to a minimum, so as to keep the load on the system to a minimum. The NodeB does this by choosing code book and/or the rate with which code words are transmitted based on information available to one or more of the NodeB, neighbouring NodeBs and the serving RNC. The concept of such information will be explained in more detail later in this text, but examples of such information are channel coherence time for the radio channel between the NodeB and the UE, the UE antenna imperfections (which can be measured implicitly via effective channel), available hardware resources such as base band processing power and number of available de-spreaders, and the delay spread in the transmissions from the UE to the NodeB.

In one embodiment, the NodeB chooses a suitable code book and identifies the code book to the UE on the HS-SCCH channel (High Speed Shared Control Channel), and then goes on to identify the code words in the code book on a per slot or per sub-frame basis. Suitably, the code words are then identified by the NodeB to the UE using a channel which has the same structure as the WCDMA channel F-DPCH, Fractional Dedicated Physical Channel. A suggested name for such a channel is F-PCICH, Fraction Pre-Coding Information Channel. An advantage of this principle is that a channel such as the F-PICH is a more dynamic channel than the HS-SCCH, and is thus more suited to the transfer of more frequent information, such as the code words, while the code book will usually not need to be changed as often, and can therefore be sent on a more "static" channel such as the HS-SCCH channel.

Thus, in embodiments, the NodeB combines usage of HS-SCCH orders for the code books with a more dynamic downlink (DL) feedback channel such as the F-PCICH for controlling the pre-coding vectors used by the UE, i.e. for the transmission of code words within a code book. Examples of such embodiments include that the NodeB chooses the size of the code book in proportion to the speed with which the radio channel conditions between the UE and the NodeB vary, so that for a slowly varying radio channel, a larger code book is chosen, and for a rapidly varying channel, a smaller code book is chosen.

Thus, since different codebooks will typically have different properties, e.g., different codebook size ("granularity"), typically, the best choice of codebook would depend on how fast the (effective) channel is varying, so that for an effective channel that varies quickly, a codebook of small size may be suitable, while a larger codebook may be a better choice for a quasi-stationary effective channels.

Figure 5:
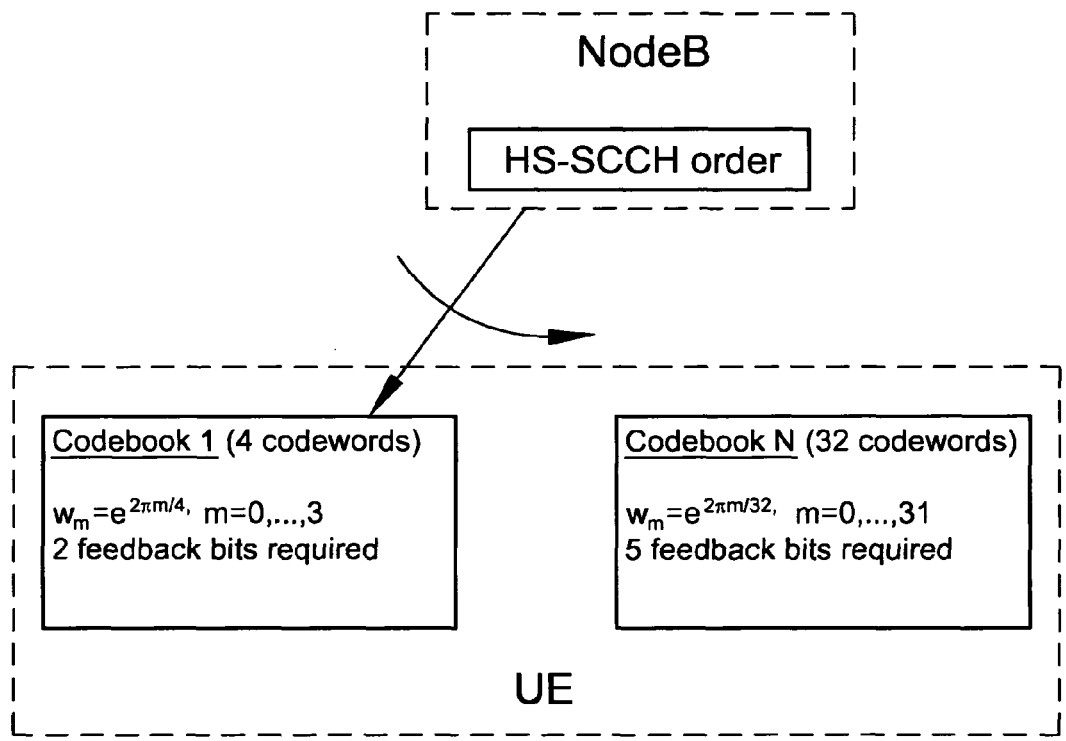
FIGS. 5-9 show various examples of signaling code books and/or code words for beam forming or transmit diversity.

For example, in one embodiment which is illustrated in FIG. 5, the (serving) Node-B transmits an HS-SCCH order to indicate one of the multiple codebooks that can be used by the Node-B and the UE. As shown in FIG. 4, the HS-SCCH order instructs the UE to change from a code book ("Code book" 1) with four code words to another code book ("Code book" N) with 32 code words, i.e. to switch to a code book with a higher granularity. As is also shown in FIG. 5, for a code book with 32 code words, 5 DL feedback bits are needed, while for a code book with four code words, only 2 DL feedback bits are required.

One example of the approach of different code words with different granularity for differing radio channel conditions could be to have three codebooks configured; one for antenna switching (requires 1 feedback bit), one for baseline beam forming consisting of the phases 0°, 90°, 180° and 270°, which requires 2 feedback bits, and one for fine-adjustment beam forming, containing, for example, the phases 0°, +5° and −5°. Note that the signalled phases from the NodeB to the UE can be absolute or relative (the relative change that should be applied to the previously used pre-coding weights). Other examples could include codebooks that contain amplitude changes as a complement to phase changes, i.e. code books with code words which identify sets of pre-coding weights which will cause amplitude differences between the signals which are transmitted from the UE's antennas.

Figure 6:
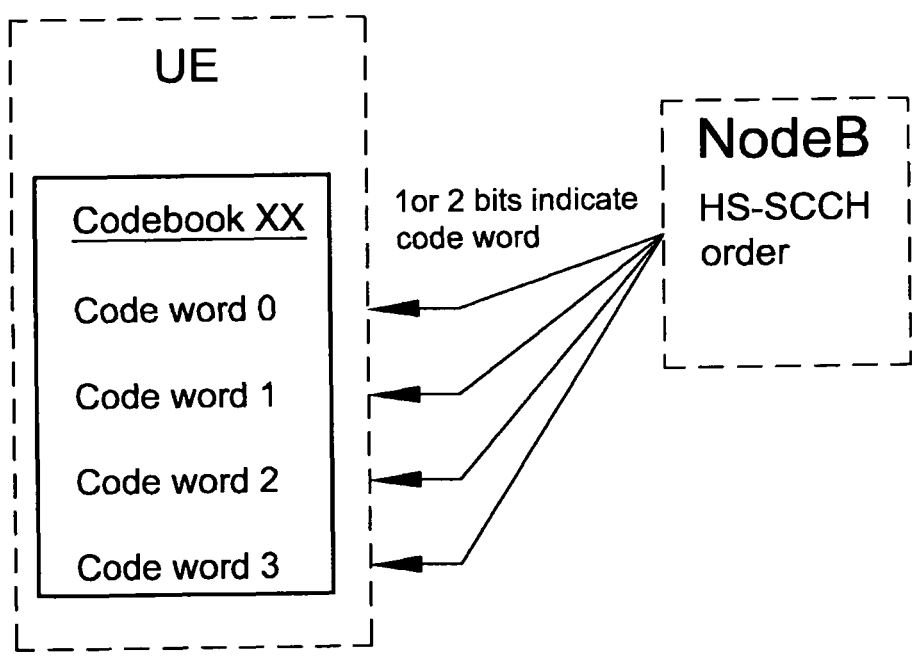

In another embodiment, the (serving) Node-B transmits an HS-SCCH order to the UE to indicate which of the code words in a given codebook that the UE should utilize. The specific choice of codebook could either be decided by the Node-B by means of an order on the HS-SCCH channel or by the S-RNC (Serving RNC) upon configuration of the UE via RRC (Radio Resource Control) signaling. An advantage of this embodiment is that it would enable the Node-B to avoid allocating, for example, hardware and code resources. An example of this embodiment is shown in FIG. 6, in which a NodeB uses a maximum of two binary digits in order to indicate a code word within a previously chosen code book XX to a UE. The identity of the code book, i.e. (symbolically) "XX" is what is signaled by the Node-B by means of an order on the HS-SCCH channel or by the S-RNC upon configuration via RRC signaling.

Figure 7:
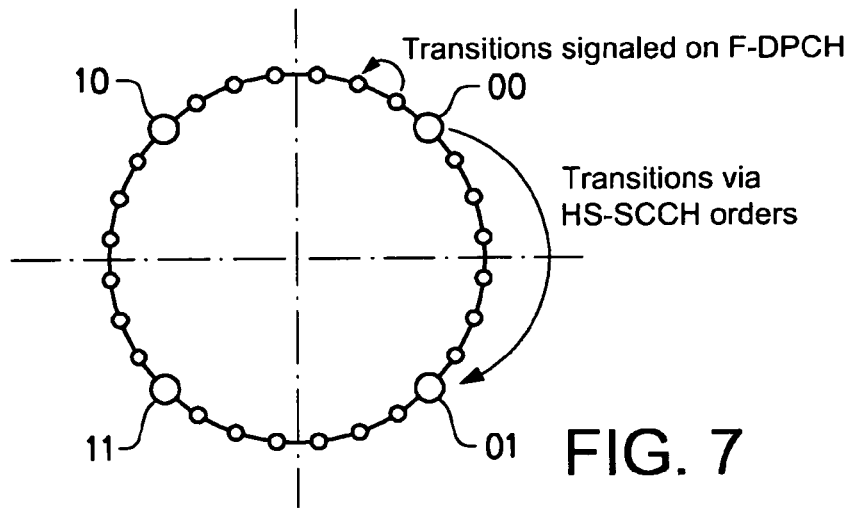

In one embodiment, illustrated in FIG. 7, the (serving) Node-B transmits an HS-SCCH order or uses RRC signaling from the serving RNC to indicate a "reference codeword" to the UE. Based on this reference codeword, the Node-B can subsequently make phase adjustments by transmitting information on dynamic feedback channel, such as, for example, F-DPCH or F-PCICH. One benefit of this approach is that it allows the network to support large and small phase changes whilst maintaining a relatively low DL overhead. The updates of the code words can either be relative (i.e. the relative phase difference is increased/decreased) by a certain amount or absolute (i.e. a specific codeword is selected). Thus, a "reference code word" is signaled to the UE as an HS-SCCH order or from the UE's Serving RNC via RRC signaling, and code words are then transmitted which indicate incremental changes from the pre-coding vector identified by the reference code word on another, more "dynamic" channel, such as the F-DPCH or the F-PCICH.

Turning now to the issue of the dynamically varying information which is available to the WCDMA network, this is information which is available to one or more of the NodeB, neighbouring NodeBs and the serving RNC and which is used by the (serving) NodeB to choose a code book and/or the rate with which the code words are transmitted to the UE. Examples of such dynamically varying information include:

- The channel coherence time for the radio channel between the UE and the NodeB. The channel coherence time is a measure of how rapidly the (effective) radio channel is changing. More explicitly, a channel characterized by a long channel coherence time varies slowly whereas a channel characterized by a small channel coherence time varies quickly. For channels with a large coherence time it could be beneficial to use a PCI code book that is large since, even though this requires more overhead to be transmitted on the downlink. On e.g. F-PCICH a signaled pre-coding vector/code word can be applied for a long time-duration. For channels with a shorter coherence time, the increased feedback delay associated with the signaling of the preferred pre-coding vectors/code words may be so long that the properties of the effective radio channels have changed significantly. In such situations, a codebook with a high granularity will not benefit the performance.
- The delay spread in the uplink transmissions from the UE to the NodeB. The delay spread can be used as a measure of how dispersive an effective channel is. A large delay spread characterizes a channel that is highly dispersive. For highly dispersive channels, the gains from beam forming becomes smaller as compared to channels with a smaller delay spread, and in order to reduce downlink overhead, it could be useful to select a codebook consisting of fewer code words.
- The available hardware resources. For example, if there is not a sufficient amount of processing resources available at the Node-B, then it could be beneficial to use a codebook consisting of fewer code words, since it will be simpler to determine the best one.
- The Doppler spread. This is an indication of how fast the effective channel is changing. For UEs which have a fast varying channel, the Node-B can choose a codebook of smaller size.
- The DPCCH SIR (Signal to Interference Ratio) variations. This can be used as an indication of how fast the channel is varying.
- The (average) DPCCH power levels or uplink power headroom information. This can be used by the Node-B to decide whether the UE is close to cell edge or not. If, for example, it is detected that a UE is close to the cell edge and that the neighboring cell does not support closed loop beam forming, then the serving Node-B could use a codebook or pre-coding mode that only supports antenna switching or only slow pre-coding weight changes. This will ensure that SHO (Soft Handover) gain is fully utilized, and that the serving cell change can be executed in a "seamless" manner.
- The active set size. This can be used in a similar fashion as the DPCCH power levels or the UPH (Uplink Power Headroom) discussed above.
- The buffer status in the UE, which e.g. is available to the Node-B via TEBS (Total E-DCH Buffer Status) information transmitted in the scheduling information. This can be used to ensure that the downlink feedback information is minimized in situations where the UE is close to being buffer limited.
- The happy bit information. The "happy bit" is defined in 3GPP document 25.321, section 11.8.1.5, version 9.3.0 of the document.
- UE antenna imbalance information. For some PA architectures a large antenna imbalance can be an indication of switching off beam forming and employing pure antenna switching instead (transmit from the superior antenna).

In embodiments, in order to further minimize the load placed the system by the DL feedback info used to identify codebooks and/or code words for UL beam forming, the codebook is designed in such a way so that the average overhead required for transmitting the feedback information is minimized. Examples of such embodiment include:

- Using "smaller" code words for DL feedback information that is more likely to be transmitted. For example, the code words in the code books in the NodeB are comprised of binary digits, and at least one code word could be comprised of fewer binary digits than another code word. Thus, code words that are more likely to be transmitted would be those which comprise fewer binary digits than those code words that are less likely to be transmitted, which would lead to less overhead in the downlink feedback transmissions.
- Choosing the rate with which the NodeB it transmits the code words to the UE based on the speed with which the effective radio channel between the UE and the NodeB varies, so that for a slowly varying effective radio channel, code words are transmitted less frequently than for a rapidly varying effective radio channel.

Figure 8:
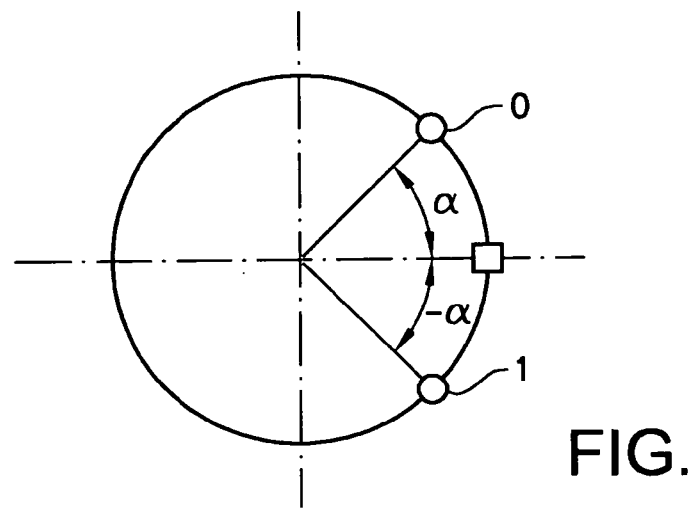
Figure 9:
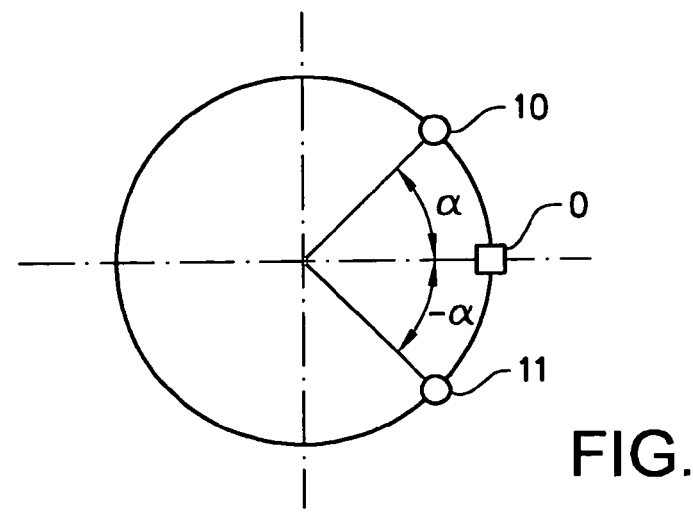

Some examples of bit assignments to code words are illustrated in Tables 1-6 below, where the code words have been assigned fewer binary digits the more likely it is that the code words are to be transmitted in a typical scenario for which the codebook is designed. Note that the code words in the codebook can represent absolute pre-coding weights, or relative pre-coding weights, that is, the relative change that should be applied to the previously used pre-coding weights. FIGS. 8 and 9 illustrate how the code words in Tables 1 and 2 below could be used in a codebook for pre-coding with relative phase adjustments:

FIG. 8 shows how feedback bits can be mapped to a codebook consisting of two code words corresponding to a phase of +/−α. This would typically be a phase adjustment relative to the previously used pre-coding weights. In the figure, the previously used phase is indicated by a square. This codebook could be suitable when HS-SCCH orders are used, so if no order is received the phase does not change, but if HS-SCCH orders are received the phase changes corresponding to the feedback received in the order. However, it can also be used when DL feedback is transmitted on a dynamic feedback channel.

FIG. 9 shows how DL feedback bits can be mapped to a codebook consisting of three code words corresponding to a phase of 0, +α or −α. This would typically be a phase adjustment relative to the previously used pre-coding weights. In the figure, the previously used phase is indicated by a square. This codebook could be suitable when a fast dynamic DL feedback channel is used, and DL feedback is continuously transmitted. Then, the DL feedback indicating no relative phase adjustment is signaled uses only one bit, while adjustments of +α or −α are signaled using two bits. This can reduce the delay compared to always using two bits for feedback information.

Combining an "absolute" codebook and a "relative" codebook. For the absolute codebook, the Node-B selects any of the code words in the code book by means of the DL feedback signaling. Thus, the NodeB in such an embodiment uses a first codebook in which the code words identify sets of pre-coding weights as absolute values, and a second codebook in which the code words are relative, i.e. identify changes in a previously used code word. This is illustrated in table 7 below. For the relative codebook, the Node-B only signals whether the UE should continue to use the same pre-coding weights or whether it should use other pre-coding weights, e.g. one of the adjacent sets of pre-coding weights. This is illustrated in table 8.

TABLE 1

| Code word | Feedback bit assignment |
| --- | --- |
| Code word 0 | 0 |
| Code word 1 | 1 |

Table 1: Examples of DL feedback bit assignment to code words for a codebook of 2 words.

TABLE 2

| Code word | Feedback bit assignment |
| --- | --- |
| Code word 0 | 0 |
| Code word 1 | 10 |
| Code word 2 | 11 |

Table 2: Examples of DL feedback bit assignment to code words for a codebook of 3 words. This codebook is suitable when the bits are received serially in time, and when code word 0 is more likely to be used than the other code words, since code word 0 can be detected after the reception of only one bit, i.e. it only requires one bit for transmission.

TABLE 3

| Code word | Feedback bit assignment |
| --- | --- |
| Code word 0 | 0 |
| Code word 1 | 10 |
| Code word 2 | 110 |
| Code word 3 | 111 |

Table 3: Examples of DL feedback bit assignment to code words for a codebook of 4 words. This codebook is suitable when the bits are received serially in time, and when code word 0 is more likely to be used than code word 1, which in turn is more likely to be used than the other code words.

TABLE 4

| Code word | Feedback bit assignment |
| --- | --- |
| Code word 0 | 0 |
| Code word 1 | 10 |
| Code word 2 | 110 |
| Code word 3 | 1110 |
| Code word 4 | 1111 |

Table 4: Examples of DL feedback bit assignment to code words for a codebook of 5 words.

TABLE 5

| Code word | Feedback bit assignment |
| --- | --- |
| Code word 0 | 0 |
| Code word 1 | 100 |
| Code word 2 | 101 |
| Code word 3 | 110 |
| Code word 4 | 111 |

Table 5: Examples of DL feedback bit assignment to code words for a codebook of 5 words. This codebook is suitable when the bits are received serially in time, and when code word 0 is more likely to be used than the other code words, which are used with approximately the same likelihood.

TABLE 6

| Code word | Feedback bit assignment |
| --- | --- |
| Code word 0 | 00 |
| Code word 1 | 01 |
| Code word 2 | 10 |
| Code word 3 | 1100 |
| Code word 4 | 1101 |
| Code word 5 | 1110 |
| Code word 6 | 1111 |

Table 6: Examples of DL feedback bit assignment to code words for a codebook of 7 words. This bit assignment is suitable when 2 bits are mapped to each symbol, and symbols are received serially in time. Then the first three code words can be detected after the reception of only one symbol, and the transmission of a new code word can be started after that, while the last 4 code words will be detected after the reception of two symbols.

TABLE 7

| Code word |
| --- |
| Code word 0 |
| Code word 1 |
| Code word 2 |
| Code word 3 |

Table 7: An example of a code book which allows explicit signaling. Note that an explicit codebook supports signaling form the Node-of any codeword that belongs to the codebook.

TABLE 8

| Code word |
| --- |
| Code word 0 |
| Code word 1 |
| Code word 2 |
| Code word 3 |
| Code word M-1 |
| Code word M |

Table 8: An example of a code book that allows implicit signalling. Note that the implicit codebook only supports signalling from the Node-of which codeword relative to the previous one the that UE should use; in this case the NodeB can signal codeword x−1 or x+1 (or x), if the previously used codeword was codeword x, where x in the table above is exemplified by code word 2, i.e. x=2.

Figure 10:
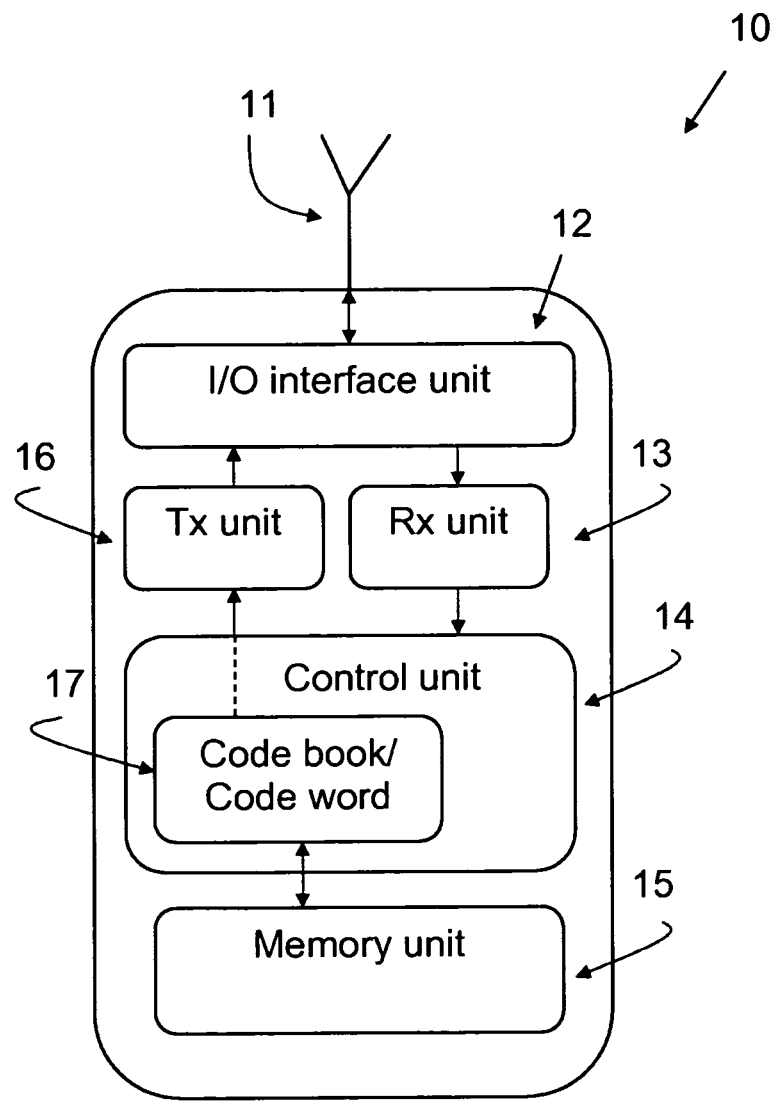
FIG. 10 shows a block diagram of a NodeB.

FIG. 10 shows a schematic block diagram of a NodeB 10 of the invention. The NodeB 10 comprises an interface unit, I/O unit 12, which is used for interfacing with, for example, the UEs in a cell, by means of an antenna unit 11. The I/O unit can also serve to interface with other nodes in the WCDMA system, such as, for example, an RNC, and the I/O unit is not restricted to wireless communication by means of the antenna unit 11, but can also let the NodeB 10 interface via, for example, land lines.

In addition, the NodeB 10 also comprises a transmit unit, Tx unit 16 for making transmissions to other nodes (e.g. UE, RNC etc) in the system via the I/O unit 12. The NodeB 10 also comprises a receive unit, Rx unit 13, for receiving communication from other nodes in the WCDMA system, (e.g. UE, RNC etc) in the system via the I/O unit 12.

A Control Unit 14 is also comprised in the NodeB 10, for processing data receive via the Rx Unit 13, as well as for preparing transmissions to be made from the Tx Unit 16, and in general, for controlling the operation of the NodeB 10.

A "code" unit 17 for choosing code book and/or code word is also shown as being comprised in the control unit 14. It should be emphasized that this is only an example, the code unit 17 can also be a "stand alone" unit within the NodeB 10 or part of other related functionality such as the MAC scheduler. The code unit 17 serves to choose code book for each UE in a cell controlled by the NodeB 10, as well as code word within a specific code book, and/or the rate with which code words are transmitted to the UE in question, based on the information available to the WCDMA network. Thus, the code unit 17 accesses information internal to the NodeB, as well as information received from the UE and the RNC in order to choose code book and code words for a specific UE. Suitably, the code unit 17 carries out its tasks with the aid of a memory unit 15, in which the code books and their code words are stored, as well as, suitably, the conditions under which a certain code book and its code words should be chosen, as well as the rate with which the code words should be transmitted.

With continued reference to the code unit 17, it should also be noted that it need not be the same entity or unit within an entity such as the NodeB that selects both the codebook and the pre-coding vector. The selection of code book could, in fact, also be performed by the S-RNC, and signalled to the UE via the NodeB, so that the NodeB would be the entity that controls the pre-coding vector selection within the code book chosen by the S-RNC.

Figure 11:
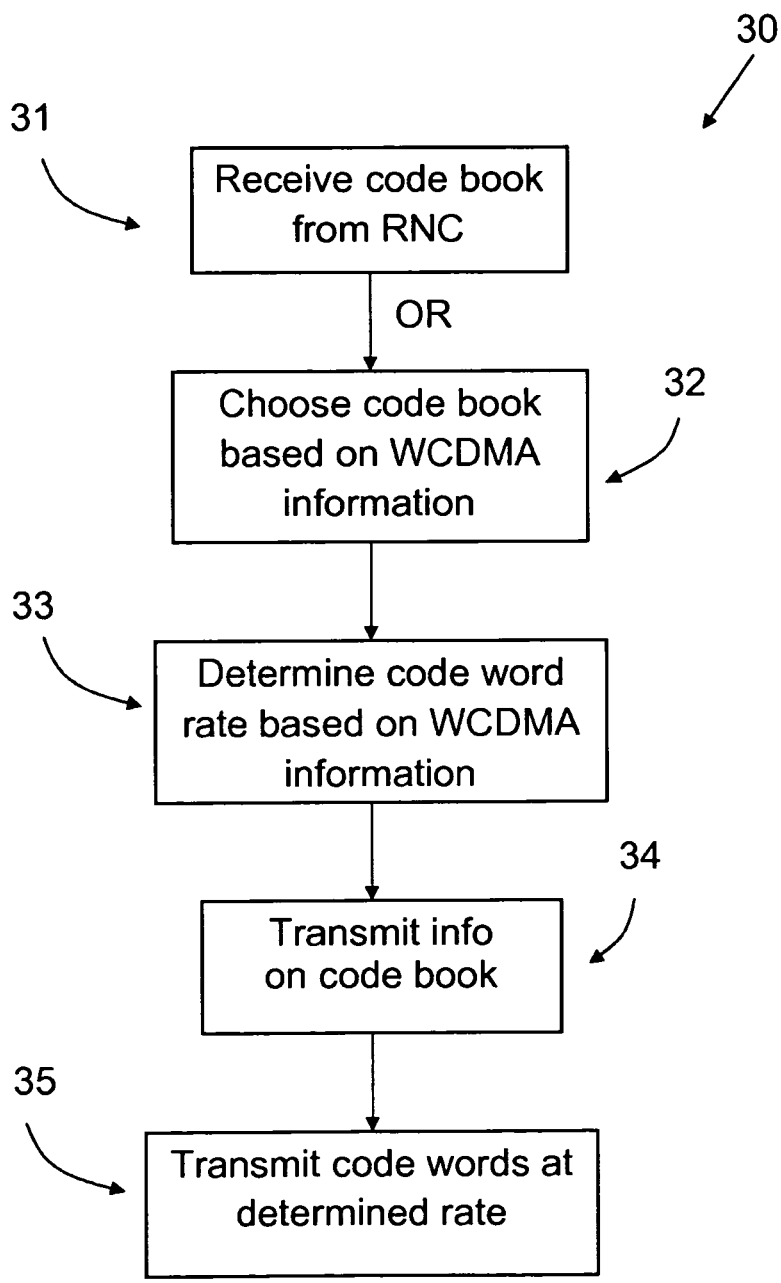
FIG. 11 shows a flow chart of a method of the invention.

FIG. 11 shows a schematic flowchart of a method 30 of the invention. The method 30 is a method for operating a NodeB in an HSPA enabled WCDMA network, and comprises transmitting beam forming instructions to a UE arranged for beam forming. The beam forming instructions comprise information identifying a codebook with one or more code words, and transmitting code words from the code book at a certain rate. The method comprises determining the code word rate based on dynamically varying information available in the WCDMA network, and receiving the information on the code book from an RNC or choosing said code book based on said dynamically varying information available in the WCDMA network.

The steps in the method need not be carried out in the order depicted in FIG. 11, but suitably, information on the code book to be used is received from the RNC, step 31, or, as an alternative, step 32, the code book is chosen based on information available in the WCDMA network.

As shown in step 33, the codeword rate is also chosen based on information available in the WCDMA network. As shown in step 34, information on the code book is transmitted to the UE, and, step 35, the code words are transmitted at the determined rate.

In embodiments, the method comprises transmitting said information on a code book on the HS-SCCH channel, and subsequently transmitting code words in said code book on a per slot or per sub-frame basis.

In embodiments, the method comprises choosing the size of the code book based on the speed with which the effective radio channel between the UE and the NodeB varies, so that for a slowly varying effective radio channel, a larger code book is chosen, and for a rapidly varying effective radio channel, a smaller code book is chosen.

In embodiments, the method comprises choosing the rate with which code words are transmitted based on the speed with which the effective radio channel between the UE and the NodeB varies, so that for a slowly varying effective radio channel, code words are transmitted less frequently than for a rapidly varying effective radio channel, code words a smaller code book is chosen.

In embodiments, the method comprises choosing code books with code words which will cause amplitude differences between the signals which are transmitted from the UE's antennas.

In embodiments, the method comprises transmitting said beam forming information to the UE as code words within a code book which has previously been identified to the UE by the NodeB as an order on the HS-SCCH channel or by the UE's Serving RNC via RRC signaling.

In embodiments, the method comprises transmitting a reference code word to the UE as an HS-SCCH order or from the UE's Serving RNC via RRC signaling, and to subsequently transmit, on another channel, code words which indicate incremental changes from the reference code word.

In embodiments, according to the method, the code words in the code books in the NodeB are comprised of binary digits, and at least one code word is comprised of fewer binary digits than another code word, and with code words that are more likely to be transmitted being those which comprise fewer binary digits than code words that are less likely to be transmitted.

In embodiments, the method comprises using a first codebook in which the code words identify absolute values for the UE's beam forming, and a second codebook in which the code words are relative, i.e. identify changes in a previously used code word.

In embodiments of the method, the dynamically varying information available in the WCDMA system is information available to one or more of the NodeB, neighbouring NodeBs and the serving RNC and comprises one or more of the following:

The channel coherence time for the radio channel between the UE and the NodeB,

The delay spread in the uplink transmissions from the UE to the NodeB,

The available hardware resources,

The Doppler spread in the uplink transmissions from the UE to the NodeB,

The DPCCH SIR variations in the uplink transmissions from the UE to the NodeB,

The average DPCCH power levels or the uplink power headroom information.

The active set size,

The buffer status in the UE,

The happy bit information

UE antenna imbalance information.

Abbreviations used in this text include the following:
DC-HSUPA Dual Cell HSUPA
DPCCH Downlink Physical Control Channel
FDD Frequency Division Duplexing
E-HICH E-DCH HARQ Acknowledgement Indicator Channel
F-DPCH Fractional DPCH
HS-SCCH High Speed Shared Control Channel
HSPA High Speed Packet Access
HSUPA High Speed Uplink Packet Access
PA Power Amplifier
RNC Radio Network Controller
RRC Radio Resource Control
SHO Soft Handover
SI Scheduling Information
SIR Signal to Interference (plus noise) Ratio
TEBS Total E-DCH Buffer Status
Tx Transmit
UE User Equipment
UL Uplink
UPH Uplink Power Headroom Embodiments of the invention are described with reference to the drawings, such as block diagrams and/or flowcharts. It is understood that several blocks of the block diagrams and/or flowchart illustrations, and combinations of blocks in the block diagrams and/or flowchart illustrations, can be implemented by computer program instructions. Such computer program instructions may be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

In some implementations, the functions or steps noted in the blocks may occur out of the order noted in the operational illustrations. For example, two blocks shown in succession may in fact be executed substantially concurrently or the blocks may sometimes be executed in the reverse order, depending upon the functionality/acts involved.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation.

The invention is not limited to the examples of embodiments described above and shown in the drawings, but may be freely varied within the scope of the appended claims.

The invention claimed is:

1. A NodeB for a High Speed Packet Access (HSPA) enabled WCDMA network, the NodeB being arranged to transmit beam forming instructions to a User Equipment (UE), the UE being arranged for beam forming, the beam forming instructions comprising information identifying a code book, the code book comprising one or more code words, the NodeB also being arranged to transmit the code words from said code book to the UE at a certain rate, the NodeB further being arranged to determine said certain rate based on dynamically varying information available in the WCDMA network, and to receive said information identifying the code book from a Radio Network Controller (RNC) upon configuration of the UE or to choose the code book based on said dynamically varying information available in the WCDMA network, the NodeB being further arranged to choose the certain rate with which the NodeB transmits the code words to the UE based on a speed with which an effective radio channel between the UE and the NodeB varies, wherein the code words for a slowly varying effective radio channel are transmitted less frequently than the code words transmitted for a rapidly varying effective radio channel.

2. The NodeB of claim 1, being arranged to transmit said information on the code book on an High Speed-Shared Control Channel (HS-SCCH), and to then transmit the code words from said code book on a per slot or per sub-frame basis.

3. The NodeB of claim 1, being arranged to choose a size of the code book based on the speed with which the effective radio channel between the UE and the NodeB varies, wherein the code book is larger for a slowly varying effective radio channel and smaller for a rapidly varying effective radio channel.

4. The NodeB of claim 1, being arranged to choose the code book from a plurality of code books, the eNodeB arranged to choose the code book with the code words which will cause amplitude differences between the signals which are transmitted from one or more antennas of the UE.

5. The NodeB of claim 1, wherein the code book was previously identified to the UE by the NodeB as an order on an High Speed-Shared Control Channel (HS-SCCH) channel or by the RNC via Radio Resource Control (RRC) signaling.

6. The NodeB of claim 1, being arranged to transmit a reference code word to the UE as an High Speed-Shared Control Channel (HS-SCCH) order or from the RNC via Radio Resource Control (RRC) signaling, and to then transmit, on another channel, the code words indicating incremental changes from the beam forming identified by the reference code word.

7. The NodeB of claim 1, in which the code words in the code book in the NodeB are comprised of binary digits, with a first code word being comprised of fewer binary digits than a second code word, wherein the first code word comprised of fewer binary digits leads to less overhead in a downlink feedback transmission than the second code word.

8. The NodeB of claim 7, in which the dynamically varying information available in the WCDMA network comprises information available to one or more of the NodeB, a neighboring NodeB, and the RNC, the dynamically varying information comprising one or more of the following:
  a channel coherence time for the effective radio channel between the UE and the NodeB,
  a delay spread in the uplink transmissions from the UE to the NodeB,
  one or more available hardware resources, a Doppler spread in the uplink transmissions from the UE to the NodeB, one or more SIR variations in the uplink transmissions from the UE to the NodeB, one or more DPCCH power levels or information relating to uplink power headroom, an average set size, a buffer status in the UE, information relating to a happy bit, and information relating to antenna imbalance.

9. The NodeB of claim 1, wherein the code book is selected from the group consisting of a first codebook in which the code words identify absolute values for beam forming by the UE, and a second codebook in which the code words identify changes in current beam forming.

10. A method for operating a NodeB in a High Speed Packet Access (HSPA) enabled WCDMA network, comprising:

transmitting beam forming instructions to a User Equipment (UE), the UE being arranged for beam forming, the beam forming instructions comprising information identifying a code book, the code book comprising one or more code words;

determining a certain rate for transmitting the code words from said code book, the certain rate determined based on dynamically varying information available in the WCDMA network; and transmitting the code words at the certain rate;

wherein said information identifying the code book is received from a Radio Network Controller (RNC) or said code book is chosen based on said dynamically varying information available in the WCDMA network, wherein the certain rate with which the NodeB transmits the code words to the UE is chosen based on a speed with which an effective radio channel between the UE and the NodeB varies, wherein the code words for a slowly varying effective radio channel are transmitted less frequently than the code words transmitted for a rapidly varying effective radio channel.

11. The method of claim 10, comprising transmitting said information on the code book on an High Speed-Shared Control Channel (HS-SCCH), and subsequently transmitting the code words in said code book on a per slot or per sub-frame basis.

12. The method of claim 10, comprising choosing a size of the code book based on the speed with which the effective radio channel between the UE and the NodeB varies, wherein the code book is larger for a slowly varying effective radio channel and smaller for a rapidly varying effective radio channel.

13. The method of claim 10, comprising choosing the code book from a plurality of code books, the eNodeB arranged to choose the code book with the code words which will cause amplitude differences between the signals which are transmitted from one or more antennas of the UE.

14. The method of claim 10, wherein the code book was previously identified to the UE by the NodeB as an order on an High Speed-Shared Control Channel (HS-SCCH) channel or by the RNC via Radio Resource Control (RRC) signaling.

15. The method of claim 10, comprising transmitting a reference code word to the UE as a High Speed-Shared Control Channel (HS-SCCH) order or from the RNC via Radio Resource Control (RRC) signaling, and to subsequently transmit, on another channel, the code words indicating incremental changes from the reference code word.

16. The method of claim 10, according to which the code words in the code book in the NodeB are comprised of binary digits, and a first code word is comprised of fewer binary digits than a second code word.

17. The method of claim 10, wherein the code book is selected from the group consisting of a first codebook in which the code words identify absolute values for beam forming by the UE, and a second codebook in which the code words identify changes in a previously used code word.

18. The method of claim 10, according to which the dynamically varying information available in the WCDMA system comprises information available to one or more of the NodeB, a neighboring NodeB, and the RNC, the dynamically varying information comprising one or more of the following:

a channel coherence time for the effective radio channel between the UE and the NodeB, a delay spread in the uplink transmissions from the UE to the NodeB, one or more available hardware resources, a Doppler spread in the uplink transmissions from the UE to the NodeB, one or more SIR variations in the uplink transmissions from the UE to the NodeB, one or more DPCCH power levels or information relating to uplink power headroom, an average set size, a buffer status in the UE, information relating to a happy bit, and information relating to antenna imbalance.

* * * * *

UNITED STATES PATENT AND TRADEMARK OFFICE
CERTIFICATE OF CORRECTION

| | | |
|---|---|---|
| PATENT NO. | : 9,198,050 B2 | Page 1 of 1 |
| APPLICATION NO. | : 13/202677 | |
| DATED | : November 24, 2015 | |
| INVENTOR(S) | : Hultell et al. | |

It is certified that error appears in the above-identified patent and that said Letters Patent is hereby corrected as shown below:

In the specification

Column 4, Line 40, delete "basis," and insert -- basis. --, therefor.

Column 5, Line 10, delete "i.e," and insert -- i.e. --, therefor.

Column 6, Line 6, delete "inter alfa," and insert -- inter alia, --, therefor.

Signed and Sealed this
First Day of March, 2016

Michelle K. Lee
*Director of the United States Patent and Trademark Office*